(12) United States Patent
Frania et al.

(10) Patent No.: US 9,873,091 B2
(45) Date of Patent: Jan. 23, 2018

(54) MEMBRANE HAVING A PORE-FREE SEPARATING LAYER AND USE AND METHOD OF MANUFACTURING A MEMBRANE

(75) Inventors: Michael Frania, Friedrichsthal (DE); Andreas Huebner, Unna (DE); Eva Maus, Basel (CH)

(73) Assignee: DELTAMEM AG, Muttenz (DE)

( * ) Notice: Subject to any disclaimer, the term of this patent is extended or adjusted under 35 U.S.C. 154(b) by 441 days.

(21) Appl. No.: 13/825,313

(22) PCT Filed: Jul. 6, 2011

(86) PCT No.: PCT/EP2011/061405
§ 371 (c)(1),
(2), (4) Date: Mar. 20, 2013

(87) PCT Pub. No.: WO2012/038110
PCT Pub. Date: Mar. 29, 2012

(65) Prior Publication Data
US 2013/0184503 A1    Jul. 18, 2013

(30) Foreign Application Priority Data

Sep. 20, 2010   (EP) .................................... 10177656

(51) Int. Cl.
| | | |
|---|---|---|
| B01D 15/00 | (2006.01) | |
| B01D 71/06 | (2006.01) | |
| B01D 61/36 | (2006.01) | |
| B01D 71/38 | (2006.01) | |
| B01D 67/00 | (2006.01) | |
| B01D 71/76 | (2006.01) | |
| B01D 71/40 | (2006.01) | |

(52) U.S. Cl.
CPC ........... *B01D 71/06* (2013.01); *B01D 61/362* (2013.01); *B01D 67/0018* (2013.01); *B01D 71/38* (2013.01); *B01D 71/76* (2013.01); *B01D 71/40* (2013.01); *B01D 2323/08* (2013.01); *B01D 2325/022* (2013.01); *B01D 2325/027* (2013.01)

(58) Field of Classification Search
CPC ................... B01D 15/00; B01D 29/00
USPC .......................................................... 568/697
See application file for complete search history.

(56) References Cited

U.S. PATENT DOCUMENTS

| | | |
|---|---|---|
| 4,877,529 A | 10/1989 | Pasternak et al. |
| 4,960,519 A | 10/1990 | Pasternak et al. |
| 4,971,699 A | 11/1990 | Bartels |
| 5,152,898 A | 10/1992 | Bartels |
| 5,700,374 A | 12/1997 | Steinhauser et al. |

FOREIGN PATENT DOCUMENTS

| | | |
|---|---|---|
| DE | 4410763 C1 | 5/1995 |
| JP | H03-137919 A | 6/1991 |
| JP | H07-241447 A | 9/1995 |
| JP | H07-265675 A | 10/1995 |

OTHER PUBLICATIONS

First Search Report dated Jul. 1, 2014, from Chinese Application No. 201180045027.7 (3 pages).
International Search Report and Written Opinion in PCT Application No. PCT/EP2011/061405 dated Jul. 6, 2011.

*Primary Examiner* — Elvis O Price
(74) *Attorney, Agent, or Firm* — Kilpatrick Townsend & Stockton LLP

(57) ABSTRACT

The invention relates to a membrane having a pore-free separating layer including a polymer mixture for separating simple alcohols and water from their mixtures with other organic fluids by means of pervaporation or vapor permeation. In accordance with the invention, the polymer mixture is composed of at least two polymer components which are taken from the group of polymer components which includes of the following polymer components: Polyvinyl alcohol, other polymers such as poly N—N-dimethylaminoethyl methacrylate (poly DMAEMA), a copolymer of DMAEMA and N-vinyl pyrrolidone (NVP) or of DMAEMA and N-vinyl caprolactam (NVCL), a terpolymer of DMAE, NVP and NVCL or of vinyl acetate ethylene vinyl chloride or from vinyl chloride ethylene acrylic ester or from vinyl acetate vinyl chloride acrylic ester. The invention further relates to the use and to a method for manufacturing a membrane in accordance with the invention.

16 Claims, No Drawings

MEMBRANE HAVING A PORE-FREE SEPARATING LAYER AND USE AND METHOD OF MANUFACTURING A MEMBRANE

This application is a U.S. National Phase under 35 USC 371 of PCT Application No. PCT/EP2011/061405 filed Jul. 6, 2011 which claims the priority of EP Application No. 10177656.5 filed on Sep. 20, 2010, the disclosures of which are incorporated by reference herein.

The invention relates to a membrane having a pore-free separating layer, including a polymer mixture for separating simple alcohols and water from their mixtures with other organic fluids by means of pervaporation or vapor permeation, as well as to the use and to a method of manufacturing such a membrane in accordance with the preamble of the independent claim of the respective category.

The invention thus relates, in addition to a new composite polymer membrane as such, in particular to a method of manufacturing composite polymer membranes and to their use for separating simple alcohols from their mixtures with organic liquids in accordance with the methods of pervaporation and vapor permeation. Furthermore, these membranes can also be used for the simultaneous separation of water and simple alcohols from their mixtures with organic liquids in accordance with the aforesaid methods.

It is known that, for example, simple alcohols such as methanol, ethanol and propanol are very easily miscible with organic liquids such as liquid hydrocarbons, ethers, ketones, acetates, esters and amines. It is further known that such mixtures can only be separated by distillation under a substantial effort and/or cost because azeotropes frequently occur. In azeotropic mixtures, the liquid phase has the same composition as the vapor phase in balance. The further distilling separation is thereby not possible without the use of entrainers.

It is known to the skilled person that in this case some components can also be separated by pervaporation or vapor permeation with the azeotropic composition.

In EP 0 096 339, EP 0 442 557 and U.S. Pat. No. 4,802,988 as well as U.S. Pat. No. 4,892,661, membranes are e.g. described which are suitable to separate water from its mixtures with organic liquids by pervaporation. It is known that the liquid mixture is brought into contact with the one side of the polymer membrane, whereas on the other side a vacuum is applied or an inert gas flow is conducted past. One or more components of the liquid mixture can permeate through the polymer membrane. Components which permeate less easily remain in the liquid phase and are enriched with it. The separating layer of the membrane is in practice often composed of cross-linked polyvinyl alcohol (PVA) which is applied to a porous support layer of a material which is suitable for an ultrafiltration membrane. Due to the desired thermal stability and chemical resistance, porous support layers of polyacrylonitrile (PAN), polysulfone (PSU) and of the hydrolyzed or saponified cellulose acetates are preferred. The porous support layer is usually applied to a fleece or to a woven cloth as a carrier layer.

The separation of methanol from mixtures with dimethyl carbonate (DMC) and methyl-t-butyl ether (MTBE) is described in U.S. Pat. No. 4,877,829; the membranes used have separating layers made of PVA or of a perfluorinated acid ion exchanger whose acid group is neutralized by quaternary ammonium salt.

DE 4 234 521 describes a membrane having a separating layer which is manufactured by plasma polymerization and which is suitable for separating methanol from its mixtures with e.g. MTBE and DMC.

A method is described in U.S. Pat. No. 4,960,519 for separating methanol from its mixtures with compounds containing oxygen; the latter include organic ethers, aldehydes, ketones and esters. The membrane is composed of a non-porous separating layer made from a mixture of PVA and PVA polyacrylic acid. This separating layer is applied to a support layer of PAN.

EP 0 674 940 describes the use of a membrane for separating simple alcohols, in particular ethanol, from mixtures with other organic liquids in accordance with the methods of pervaporation and vapor permeation. The separating layer of the membrane is composed of a film of a homopolymer, copolymer or terpolymer. Poly N—N-dimethylaminoethyl methacrylate (poly DMAEMA) is used as the homopolymer; a copolymer from DMAEMA and N-vinyl pyrrolidone (NVP) or from DMAEMA and N-vinyl caprolactam (NVCL) is used as the copolymer; and a terpolymer from DMAEMA, NVP and NVCL is used as the terpolymer. Such polymers are particularly preferred in which the nitrogen atom of the amine group of the DMAEMA is present as a quaternary ammonium. Preferred quaternary agents are dimethyl sulfate and, diethyl sulfate as well as monochloromethane and monochloroethane, monoiodide methane and monobromomethane and monoiodide ethane and monobromoethane. To manufacture the separating layer, the homopolymer, copolymer or terpolymer is dissolved in water, ethanol or their mixtures and is applied to a porous support layer. The vaporization of the solvent takes place at 50° C.-100° C., the film is subsequently cross-linked by heat treatment, particularly preferably at temperatures between 120° C.-160° C. The polymer film as stated becomes insoluble in water and ethanol by the thermal treatment.

The technical use of membranes known from the prior art for separating light alcohols from organic mixtures is, however, greatly restricted, above all in the presence of water at higher temperatures. The membrane then swells up so much in part in a plurality of organic solvents such as ethers, ketones and multivalent alcohols that it can be destroyed. Membranes having solid ions change their behavior when they come into contact with water or salts.

It is therefore the object of the invention to provide a membrane for separating simple alcohols from organic mixtures as well as to provide the use of and to provide a method of manufacturing such a membrane which avoids the disadvantages known from the prior art. The membrane should above all, but not only, also be able to be used reliably in the presence of water and at higher temperatures and should in this respect, contrary to the prior art, not swell up so much that it can be destroyed in organic solvents such as ethers, ketones and multivalent alcohols. In this respect, the membrane should simultaneously show good selectivities, flows and stability even at higher water concentrations and higher temperatures and should show a high selectivity and simultaneously a high flow for alcohols in the absence of water.

The subjects of the invention satisfying these objects in an apparatus and a technical process respect are characterized by the features of independent claims 1, 5 and 7.

The respective dependent claims relate to particularly advantageous embodiments of the invention.

The invention thus relates to a membrane having a pore-free separating layer including a polymer mixture for separating simple alcohols and water from their mixtures with other organic fluids by means of pervaporation or vapor permeation. In accordance with the invention, the polymer mixture is composed of at least two polymer components which are taken from the group of polymer components which includes the following polymer components: Polyvinyl alcohol, other polymers such as poly N—N-dimethylaminoethyl methacrylate (poly DMAEMA), a copolymer of DMAEMA and N-vinyl pyrrolidone (NVP) or of DMAEMA and N-vinyl caprolactam (NVCL), a terpolymer of DMAEMA, NVP and NVCL or of vinyl acetate ethylene vinyl chloride or from vinyl chloride ethylene acrylic ester or from vinyl acetate vinyl chloride acrylic ester.

It has been found in a surprising manner that membranes can be manufactured whose use in accordance with the present invention for separating simple alcohols or simple alcohols and water simultaneously shows good selectivities, flows and stabilities even at higher water concentrations and higher temperatures. The selectivity and flow for alcohols are also very high in the absence of water.

In this respect, in a preferred embodiment, the polymer solution is applied to a porous sub-structure having an asymmetrical pore structure and the porous sub-structure lies in turn on a carrier layer.

A membrane in accordance with the invention is used for separating simple alcohols and water from their mixtures with other organic fluids by means of pervaporation or vapor permeation.

On the use of a membrane in accordance with the invention, the alcohol permeating through the membrane is preferably a methanol, an ethanol or a propanol and the substance held back by the membrane is specifically an aliphatic or aromatic hydrocarbon, an ether, ketone, ester or a higher alcohol or a mixture of components from this group.

The invention further relates to a method of manufacturing a membrane having a pore-free separating layer including a polymer mixture for separating simple alcohols and water from their mixtures with other organic fluids by means of pervaporation or vapor permeation. In accordance with the present invention, the polymer mixture is manufactured from two polymer components which are taken from the group of polymer components including: Polyvinyl alcohol, other polymers such as poly N—N-dimethylaminoethyl methacrylate (poly DMAEMA), a copolymer of DMAEMA and N-vinyl pyrrolidone (NVP) or of DMAEMA and N-vinyl caprolactam (NVCL), a terpolymer of DMAE, NVP and NVCL or of vinyl acetate ethylene vinyl chloride or from vinyl chloride ethylene acrylic ester or from vinyl acetate vinyl chloride acrylic ester.

In a specific embodiment of the present invention, in this respect, a solvent of the homopolymers, copolymers or terpolymers and polyvinyl alcohol in water, ethanol or an ethanol-water mixture is used for manufacturing the separating layer. The polymer solution is preferably applied to a porous sub-structure having an asymmetrical pore structure and the porous sub-structure is in turn applied to a carrier layer.

After the application of the polymer solution, the solvent can be vaporized and the membrane can be subjected to a heat treatment. In an embodiment particularly important for practice, the heat treatment takes place at a temperature between 100° C. and 200° C., preferably at a temperature from 130° C. to 180° C. In a plurality of practical cases, in this respect, the heat treatment is carried out during a time period from 1 min to 60 min, preferably during a time period from 5 min to 30 min. The heat treatment is particularly preferably carried out in one or more stages, particularly preferably in two stages. The temperature of a following stage can in this respect, for example, be higher than the temperature of a preceding stage.

In the following, some embodiments of the present invention particularly important for practice will be described in somewhat more detail.

The separating layer of the membranes used in accordance with the present invention is composed of a polymer blend film produced from at least two polymers. The polymers can be homopolymers, copolymers and terpolymers. Polyvinyl alcohol and poly-N—N-dimethylaminoethyl methacrylate (poly DMAEMA) are used as the homopolymer; a copolymer of DMAEMA and N-vinyl pyrrolidone (NVP) or of DMAEMA and N-vinyl caprolactam (NVCL) is used as the copolymer; a terpolymer of DMAEMA, NVP and NVCL, of vinyl acetate ethylene vinyl chloride, of vinyl chloride ethylene acrylic ester or of vinyl acetate vinyl chloride acrylic ester is used as the terpolymer.

The content of polyvinyl alcohol can amount to between 1% by weight to 90% by weight, preferably 3% by weight to 80% by weight; the content of other polymers can amount to between 10% by weight to 99% by weight, preferably 20% by weight to 97% by weight. Polyvinyl alcohol is admixed as a watery solution; the cross-linking takes place by esterification with dicarboxylic acids, preferably those which additionally contain hydroxyl groups and/or keto groups, by etherification under the catalytic effect of the acids, by acetalization by means of aldehydes or dialdehydes or by a combined application of these methods.

To manufacture the separating layer, the homopolymers, copolymers or terpolymers are dissolved in water, ethanol or a mixture of water-ethanol. The concentrations between 2% by weight and 60% by weight (in dependence on the molecular weight) are preferred; concentrations between 3% by weight and 20% by weight are particularly preferred. The solution is applied to a substrate by means of a method known per se to the skilled person. The pore-free separating layer is preferably located on a porous support layer. Applying the polymer film as a separating layer to a composite structure has proved to be particularly advantageous. As is known to the skilled person, it is composed of a carrier layer, e.g. of a fleece or fabric of polyester, polypropylene, polyethylene, polyamide, polyphenylene sulfide or other polymers. A porous structure having an asymmetrical pore structure, preferably made of polyacrylonitrile, polysulfone, polyvinylidene fluoride, polyamide, polyetherimide or other polymers is located on this carrier layer.

After the application and the vaporization of the solvent, a pore-free, dense polymer film is formed whose thickness is dependent on the concentration and on the application method. Polymer films between 0.5 μm and 20 μm thickness are preferred; polymer films from 1 μm to 6 μm are particularly preferred.

The vaporization of the solvent takes place at 60° C. to 160° C. The film is subsequently cross-linked through heat treatment, preferably at temperatures from 100° C. to 200° C., particularly preferably 130° C. to 180° C., in times between 1 min to 60 min. It has proved to be advantageous to carry out the heat treatment in a plurality of stages, wherein a two-stage procedure is preferred, e.g. at 100° C. to 140° C. for 1 min to 6 min, then in a second stage at 150° C. to 180° C. for 6 min to 30 min.

EXAMPLE 1

A solution of 6% polymer mixture in water is applied with an application roller onto a porous support layer of polyacrylonitrile (PAN) which has an asymmetrical pore structure and which is applied to a carrier layer of a polyester fleece. The polymer mixture is composed of polymers in a ratio of 70% by weight of a copolymer of vinyl pyrrolidone and dimethylaminoethyl methacrylate and a 30% by weight portion of polyvinyl alcohol and is applied using an application roller. The solvent is evaporated at 125° C. in 6 min. The membrane is then thermally treated at 150° C. for 20 min. and in a second step further thermally cross-linked at 170° C. for 10 min. The separating layer of the finished membrane has a thickness of approximately 3 µm. In a pervaporation trial, it is tested at 80° C. with an inflow mixture of 40% methanol and 60% tetrahydrofuran. The permeate contains 72% by weight methanol, the methanol flow amounts to 8 kg/m²h at a pressure on the permeate side of 20 mbar. The permeate is condensed by cooling with a mixture of dry ice and ethanol.

EXAMPLE 2

A 5% watery polymer mixture, composed of a 90% by weight portion of a quaternary copolymer of vinyl pyrrolidone and dimethylaminoethyl methacrylate and a 10% by weight portion of a copolymer of vinyl acetate, ethylene and vinyl chloride (VAC/E/VC), is applied to the same sub-structure as in Example 1 using an application roller. The evaporation of the solvent took place after 7 min at 130° C.; the membrane is then heat treated at 150° C. for 21 min. A pervaporization trial with an inflow mixture of 21% by weight ethanol and 79% by weight ethyl-t-butylether (ETBE) at 62° C. produced 94% by weight ethanol in the permeate at 1.35 kg/m²h ethanol flow at a pressure on the permeate side of 13 mbar. The permeate is condensed by cooling with a mixture of dry ice and ethanol.

EXAMPLE 3

A 4.5% watery polymer mixture, composed of a 30% by weight portion of a copolymer of vinyl pyrrolidone and dimethylaminoethyl methacrylate and of a 70% by weight portion of polyvinyl alcohol, is applied to the same sub-structure as in Example 1 using an application roller. The evaporation of the solvent takes place after 6 min at 150° C.; the membrane is then post cross-linked at 145° C. for 24 min. A pervaporization trial with an inflow mixture of 6% by weight water, 14% by weight acetone, 50% by weight methanol and 30% by weight ketal at 95° C. produced 33% by weight water, 60% by weight methanol and 7% acetone in the permeate at 2.1 kg/m²h methanol flow and 1.1 kg/m²h water flow with a pressure at the permeate side of 13 mbar. The permeate is condensed by cooling with a mixture of dry ice and ethanol.

EXAMPLE 4

A 4.5% watery polymer mixture, composed of a 60% by weight portion of a copolymer of vinyl pyrrolidone and dimethylaminoethyl methacrylate and of a 40% by weight portion of polyvinyl alcohol, is applied to the same sub-structure as in Example 1 using an application roller. The evaporation of the solvent took place after 6 min at 150° C., the membrane is then thermally treated at 150° for 15 min and is further cross-linked in a second step at 180° C. for 10 min. A pervaporation trial with an inflow mixture of 30% by weight methanol and 70% by weight acetone at 60° C. produced 70% by weight methanol in the permeate at 2.5 kg/m²h methanol flow at a pressure on the permeate side of 10 mbar. The permeate is condensed by cooling with a mixture of dry ice and ethanol.

EXAMPLE 5

A 5% watery polymer mixture, composed of a 90% by weight portion of a quaternary copolymer of vinyl pyrrolidone and dimethylaminoethyl methacrylate and a 7% by weight portion of a copolymer of vinyl acetate, ethylene and vinyl chloride (VAC/E/VC) and a 3% by weight portion of polyvinyl alcohol, is applied to the same sub-structure as in Example 1 using an application roller. The evaporation of the solvent took place after 7 min at 130° C.; the membrane is then heat treated at 150° C. for 21 min. A pervaporization trial with an inflow mixture of 21% by weight ethanol and 79& by weight ethyl-t-butylether (ETBE) at 62° VC produced 97% by weight ethanol in the permeate at 0.65 kg/m²h ethanol flow at a pressure on the permeate side of 13 mbar. The permeate is condensed by cooling with a mixture of dry ice and ethanol.

It is understood that the present invention is not restricted to the embodiments explicitly described within the framework of this application, but also includes in total all combinations which the skilled person easily understands in an obvious manner for the formation of further embodiments.

The invention claimed is:

1. A membrane having a pore-free separating layer including a polymer mixture for separating simple alcohols and water from their mixtures with other organic fluids by means of pervaporation or vapor permeation, characterized in that the polymer mixture is composed of at least two different polymers which are taken from the group of polymer components including:
   polyvinyl alcohol;
   poly N—N-dimethylaminoethyl methacrylate (poly DMAEMA);
   a copolymer of DMAEMA and N vinyl pyrrolidone (NVP) or of DMAEMA and N vinyl caprolactam (NVCL);
   a terpolymer of DMAEMA, NVP and NVCL or of vinyl acetate ethylene vinyl chloride or of vinyl chloride ethylene acrylic ester or of vinyl acetate vinyl chloride acrylic ester.

2. A membrane in accordance with claim 1, wherein the polymer solution is applied to a porous sub-structure having an asymmetrical pore structure and the porous sub-structure in turn lies on a carrier layer.

3. A membrane in accordance with claim 1, wherein the content of polyvinyl alcohol amounts to between 1% by weight to 90% by weight, preferably 3% by weight to 80% by weight.

4. A membrane in accordance with claim 3, wherein the content of other polymers amounts to between 10% by weight to 99% by weight, preferably between 20% by weight and 97% by weight.

5. Use of a membrane for separating simple alcohols and water from their mixtures with other organic fluids by means of pervaporation or vapor permeation, wherein the membrane includes a pore-free separating layer with a polymer mixture, characterized in that the polymer mixture is composed of at least two different polymers which are taken from the group of polymer components including:
   polyvinyl alcohol;
   poly N—N-dimethylaminoethyl methacrylate (poly DMAEMA);

a copolymer of DMAEMA and N vinyl pyrrolidone (NVP) or of DMAEMA and N vinyl caprolactam (NVCL);

a terpolymer of DMAEMA, NVP and NVCL or of vinyl acetate ethylene vinyl chloride or of vinyl chloride ethylene acrylic ester or of vinyl acetate vinyl chloride acrylic ester.

6. Use of a membrane in accordance with claim 5, wherein the alcohol permeating through the membrane is a methanol, ethanol or a propanol, and the substance held back by the membrane is an aliphatic or aromatic hydrocarbon, an ether, keton, ester or a higher alcohol or a mixture of components from this group.

7. A method for manufacturing a membrane having a pore-free separating layer including a polymer mixture for separating simple alcohols and water from their mixtures with other organic fluids by means of pervaporation or vapor permeation, characterized in that the polymer mixture is composed of at least two different polymers which are taken from the group of polymer components including:

polyvinyl alcohol;

poly N—N-dimethylaminoethyl methacrylate (poly DMAEMA);

a copolymer of DMAEMA and N vinyl pyrrolidone (NVP) or of DMAEMA and N vinyl caprolactam (NVCL);

a terpolymer of DMAEMA, NVP and NVCL or of vinyl acetate ethylene vinyl chloride or of vinyl chloride ethylene acrylic ester or of vinyl acetate vinyl chloride acrylic ester.

8. A method in accordance with claim 7, wherein a solution of the homopolymers, copolymers or terpolymers and polyvinyl alcohol in water, ethanol or in ethanol-water mixtures is used to manufacture the separating layer.

9. A method in accordance with claim 7, wherein the polymer solution is applied to a porous sub-structure having an asymmetrical pore structure and the porous sub-structure is in turn applied to a carrier layer.

10. A method in accordance with claim 7, wherein the solvent is vaporized after the application of the polymer solution and the membrane is subjected to a heat treatment.

11. A method in accordance with claim 7, wherein the heat treatment takes place at a temperature between 100° C. and 200° C., preferably from 130° C. to 180° C.

12. A method in accordance with claim 7, wherein the heat treatment is carried out during a time period of 1 min to 60 min, preferably during a time period of 5 min to 30 min.

13. A method in accordance with claim 7, wherein the heat treatment is carried out in one or more stages.

14. A method in accordance with claim 13, wherein the heat treatment is carried out in two stages.

15. A method in accordance with claim 13, wherein a temperature of a following stage is higher than a temperature of a preceding stage.

16. A membrane in accordance with claim 1, wherein the pore-free separating layer is provided on a porous support layer having an asymmetrical pore structure, the porous support layer is provided on a carrier layer of a polyester fleece.

* * * * *

UNITED STATES PATENT AND TRADEMARK OFFICE
CERTIFICATE OF CORRECTION

PATENT NO. : 9,873,091 B2
APPLICATION NO. : 13/825313
DATED : January 23, 2018
INVENTOR(S) : Michael Frania et al.

It is certified that error appears in the above-identified patent and that said Letters Patent is hereby corrected as shown below:

Item (73) should read:
(73) Assignee: DELTAMEM AG, Muttenz (CH).

Signed and Sealed this
Tenth Day of April, 2018

Andrei Iancu
*Director of the United States Patent and Trademark Office*